US012266255B2

(12) United States Patent
Nagata

(10) Patent No.: US 12,266,255 B2
(45) Date of Patent: Apr. 1, 2025

(54) APPARATUS AND METHOD TO DISPLAY WHEELCHAIR INFORMATION ON A BUS

(71) Applicant: TOYOTA JIDOSHA KABUSHIKI KAISHA, Toyota (JP)

(72) Inventor: Yu Nagata, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 18/329,626

(22) Filed: Jun. 6, 2023

(65) Prior Publication Data

US 2023/0401950 A1    Dec. 14, 2023

(30) Foreign Application Priority Data

Jun. 10, 2022   (JP) ................. 2022-094342

(51) Int. Cl.
| | |
|---|---|
| G08B 21/22 | (2006.01) |
| B60Q 9/00 | (2006.01) |
| G06Q 30/015 | (2023.01) |
| G06Q 50/22 | (2018.01) |
| G08G 1/133 | (2006.01) |

(52) U.S. Cl.
CPC ............ *G08B 21/22* (2013.01); *B60Q 9/00* (2013.01); *G06Q 30/015* (2023.01); *G06Q 50/22* (2013.01); *G08G 1/133* (2013.01)

(58) Field of Classification Search
CPC .......... G08B 21/22; B60Q 9/00; G08G 1/133; G06Q 30/015; G06Q 50/22
See application file for complete search history.

(56) References Cited

U.S. PATENT DOCUMENTS

| | | | |
|---|---|---|---|
| 11,900,809 B2 * | 2/2024 | Takamura | ............ B60Q 5/005 |
| 2020/0074159 A1 | 3/2020 | Ohnishi et al. | |
| 2020/0410408 A1 | 12/2020 | Shitara et al. | |
| 2021/0125110 A1 * | 4/2021 | Yamazaki | ............ G06N 20/00 |

FOREIGN PATENT DOCUMENTS

| | | | | | |
|---|---|---|---|---|---|
| JP | 2020038608 A | * | 3/2020 | ............ | E05F 15/73 |
| JP | 2020112866 A | * | 7/2020 | | |
| JP | 2021009452 A | | 1/2021 | | |
| JP | 2021071804 A | | 5/2021 | | |
| JP | 2021157276 A | * | 10/2021 | | |

* cited by examiner

*Primary Examiner* — John A Tweel, Jr.
(74) *Attorney, Agent, or Firm* — Dickinson Wright, PLLC

(57) ABSTRACT

The information processing apparatus outputs specific information, including information related to getting on and off the bus for a specific user who uses the bus using a wheelchair, via a predetermined display device. Here, the information processing apparatus outputs the specific information via the specified display device from a predetermined time before the time when the bus stops for boarding or alighting the bus by the specified user.

18 Claims, 14 Drawing Sheets

| USER INFORMATION | | | | |
|---|---|---|---|---|
| USER ID | TERMINAL INFORMATION | BOARDING POINT | DROP-OFF POINT | REMARKS |
| *** | *** | *** | *** | *** |
| *** | *** | *** | *** | WHEELCHAIR USE |
| ... | ... | ... | ... | ... |
| ... | ... | ... | ... | ... |

FIG. 5

| OPERATION INFORMATION | | | | | |
|---|---|---|---|---|---|
| BUS ID | DEPARTURE POINT | DEPARTURE TIME | ARRIVAL POINT | ARRIVAL TIME | OPERATION NUMBER |
| *** | *** | *** | *** | *** | 1 |
| | *** | *** | *** | *** | 2 |
| | *** | *** | *** | *** | 3 |
| | ... | ... | ... | ... | ... |

FIG. 6

APPARATUS AND METHOD TO DISPLAY WHEELCHAIR INFORMATION ON A BUS

CROSS REFERENCE TO THE RELATED APPLICATION

This application claims the benefit of Japanese Patent Application No. 2022-094342, filed on Jun. 10, 2022, which is hereby incorporated by reference herein in its entirety.

BACKGROUND

Technical Field

The present disclosure is about information processing apparatus, information processing method, and non-transitory storage medium.

Description of the Related Art

Patent Literature 1 discloses the wheelchair ride information transmission system. Patent Literature In the wheelchair boarding information transmission system disclosed in 1, it is detected whether or not a wheelchair boarding is made in said wheelchair boarding space in vehicle with wheelchair boarding space. In the wheelchair access information transmission system, based on the detection results, information is transmitted to the outside of the vehicle as to whether or not a wheelchair is being boarded.

Patent Literature 1: Japanese Patent Application Laid-Open Publication No. 2021-009452

SUMMARY

The purpose of the present disclosure is to promote the use of buses by wheelchair users.

An information processing apparatus according to a first mode of the present disclosure comprise a controller comprising at least one processor configured to:
output, via a predetermined display device, specific information related to the boarding and alighting of a bus by a specified user using a wheelchair, from a predetermined time before the time when a bus stops for the specific user to board and alight the bus.

An information processing method according to a second mode of the present disclosure is
an information processing method that is performed by a computer, the method includes:
outputting, via a predetermined display device, specific information related to the boarding and alighting of a bus by a specified user using a wheelchair, from a predetermined time before the time when a bus stop for the specific user to board and alight the bus.

A non-transitory storage medium according to a third mode of the present disclosure is
a non-transitory storage medium storing a program for causing a computer to perform an information processing method, wherein the information processing method includes:
outputting, via a predetermined display device, specific information related to the boarding and alighting of a bus by a specified user using a wheelchair, from a predetermined time before the time when a bus stops for the specific user to board and alight the bus.

The present disclosure can facilitate the use of buses by wheelchair users.

BRIEF DESCRIPTION OF THE DRAWINGS

FIG. 5 indicates an example of the table structure of user information held in the user information database;
FIG. 6 indicates an example of the table structure of operation information maintained in the operation information database.

DESCRIPTION OF THE EMBODIMENTS

Assume that a wheelchair user uses a bus. In this case, it is assumed that when a wheelchair user uses a bus, other users may be present around the bus entrance and exit, etc. If this is the case, the presence of bus users other than wheelchair users around bus entrances and exits may create obstacles for wheelchair users to get on and off the bus. This would be expected to result in a time-consuming process for wheelchair users to get on and off the bus. It is also anticipated that a wheelchair user may have to directly ask other bus users to vacate the area around the entrance, etc., in order to get on and off the bus.

Thus, when a wheelchair user gets on and off the bus, the presence of other users around the bus entrance, etc., may cause the wheelchair user to feel annoyed when using the bus. As a result, it is anticipated that wheelchair users will be discouraged from using the bus.

Therefore, a controller in information processing apparatus pertaining to the first aspect of present disclosure outputs the specific information via the predetermined display device. Here, specific information includes information related to getting on and off the bus for a specific user who uses the bus using a wheelchair. The controller in the information processing apparatus outputs the specific information via the specified display device from a predetermined time before the time when the bus stops for the predetermined user to get on and off the bus.

By having the specific information output to the predetermined display device from a predetermined time before the bus stops for boarding or alighting the bus by a specific user, the general public can know that the specific user will board or alight the bus before the specific user does so, before the specific user boards or disembarks from the bus. This will inhibit the presence of general users around the bus entrance when a specific user is boarding/exiting the bus. In this way, the hassle that certain users experience when getting on and off the bus is suppressed. As a result, the use of buses by wheelchair users can be facilitated.

Specific embodiments of the present disclosure will be described below on the basis of the drawings. The technical scope of the present disclosure is not limited to sizes, materials, shapes, relative arrangement, and the like of constituent components described in the present embodiments unless otherwise described.

1st Embodiment (System Overview)

Figure 1:
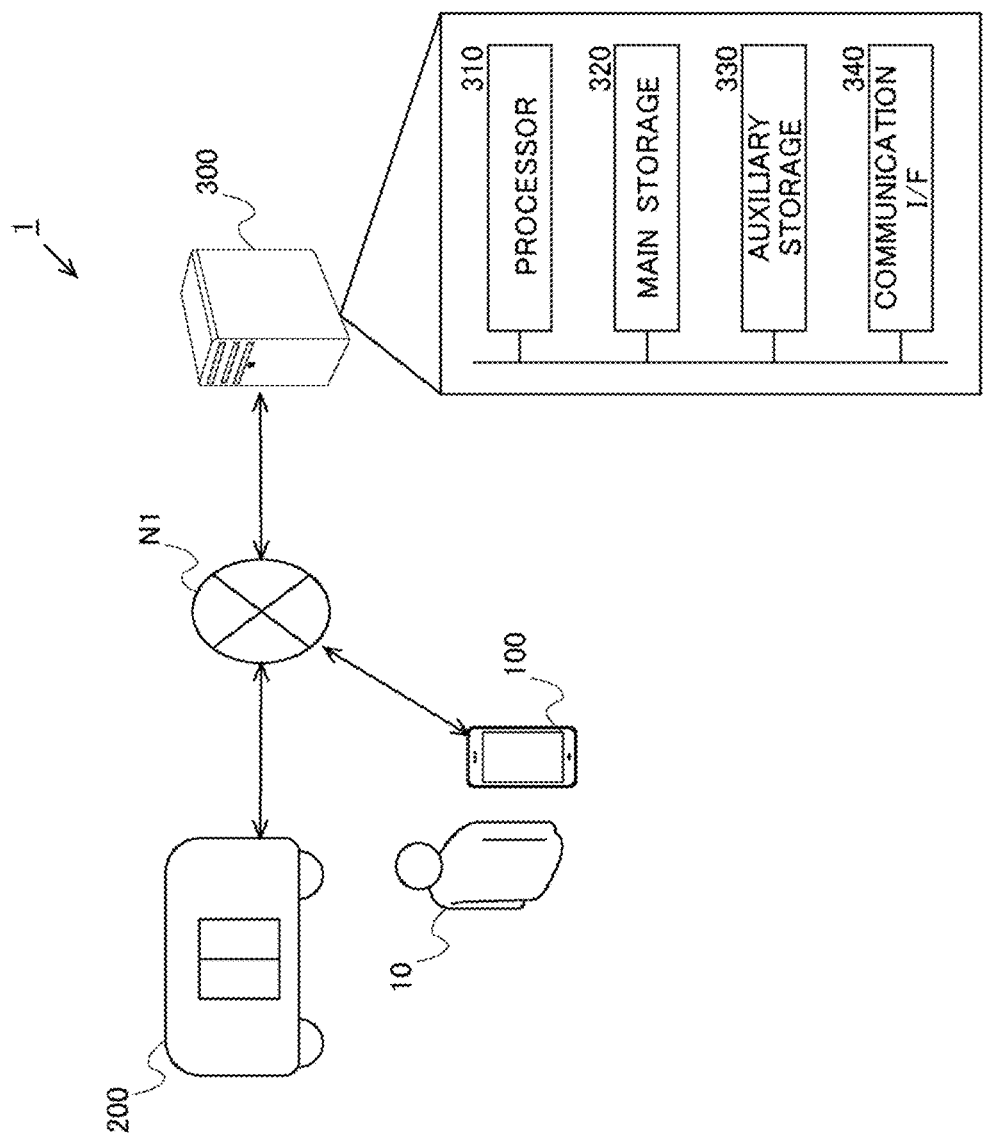
FIG. 1 indicates the schematic diagram of the operation system for the first embodiment.
Figure 2:
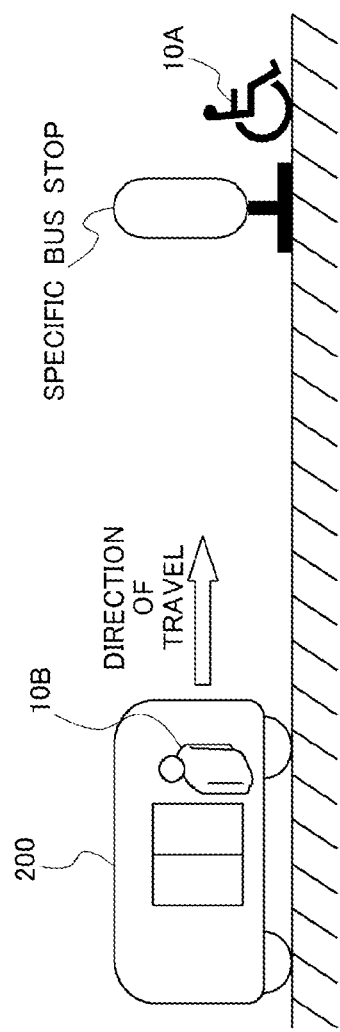
FIG. 2 indicates the status of bus operations in the first embodiment.
Figure 3:
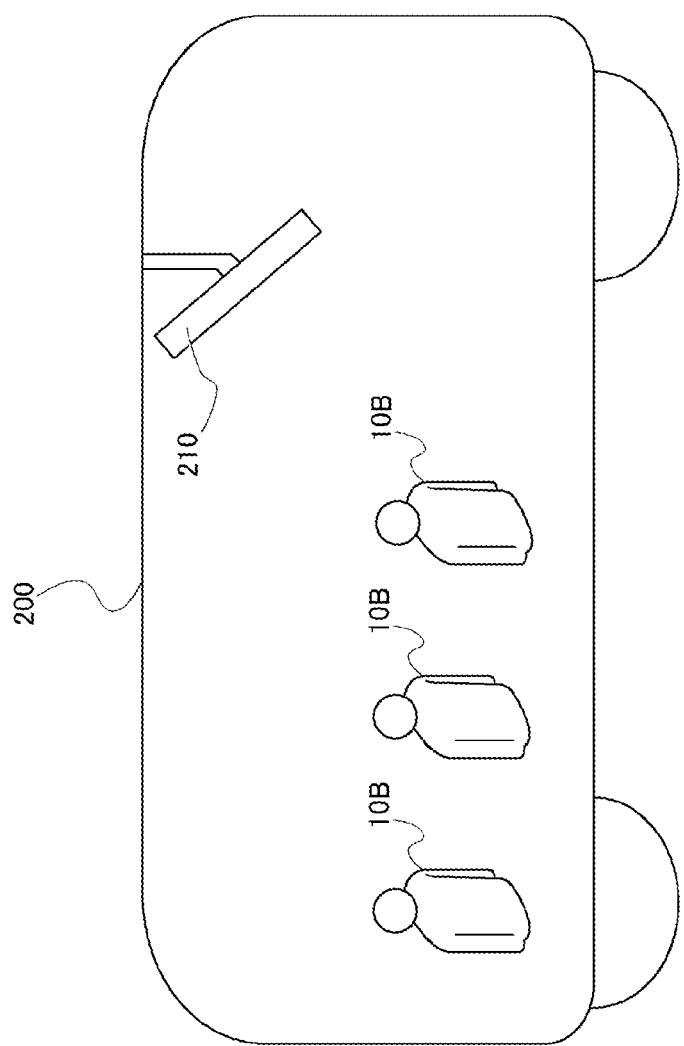
FIG. 3 indicates an example of the inside of a bus in the first embodiment.

The operations system 1 in this embodiment are explained based on FIG. 1 to FIG. 3. FIG. 1 indicates the schematic diagram of the operation system for the first embodiment. Operation system 1 consists of a user terminal 100, a bus 200, and a management server 300. In operation system 1, the user terminal 100, the bus 200, and the management server 300 are interconnected by network N1. For example, a Wide Area Network (WAN), which is a worldwide public communication network such as the Internet, or a telephone communication network such as a cellular phone may be used for network N1.

(User Terminal)

User terminal 100 is a terminal associated with user 10. As user terminal 100, a computer or portable information terminal used by user 10 can be used as an example. The user 10 uses the user terminal 100 to apply for use of the bus 200. When the user terminal 100 receives an application for use of the bus 200 by the user 10, it sends the application information to the management server 300 via network N1.

The application information includes information about the point at which the user 10 will board the bus 200 and the point at which the user 10 plans to disembark from the bus 200. In this embodiment, the point where the user 10 is scheduled to board the bus 200 and the point where the user 10 is scheduled to disembark from the bus 200 are the bus stops where the bus 200 stops. The point where the user 10 is scheduled to board the bus 200 and the point where the user 10 is scheduled to disembark from the bus 200 may be, for example, any point designated by the user 10. In this case, the bus 200 stops at any point designated by the user 10 and allows the user 10 to get on and off the bus by being assigned a scheduled travel route from management server 300 via any point designated by the user 10.

There are users 10 who use the bus 200 using a wheelchair (hereinafter referred to as "user 10A") and users 10 who use the bus 200 without a wheelchair (hereinafter referred to as "user 10B"). When an application for use of the bus 200 is made by user 10A, an application information is sent to management server 300 containing indicate information that user 10A is a wheelchair user.

(Bus)

Bus 200 is a bus that operates between multiple bus stops based on applications for use from users 10. FIG. 2 indicates the operation of the bus 200 in this embodiment. As FIG. 2 indicates, user 10B is on board the bus 200. The bus 200 is traveling toward the bus stop where user 10A is waiting for the bus 200 to arrive in order to board the bus 200 (hereinafter referred to as "specific bus stop").

FIG. 3 indicates an example of the inside of a bus in the first embodiment. As indicate in FIG. 3, the bus 200 includes display 210. The display 210 is a display to show information to user 10B. The display 210 displays specific information before bus 200 arrives at a specific bus stop. Here, the specific information is information related to the boarding of the bus 200 by user 10A. In this embodiment, the specific information includes information for requesting that the area around the entrance to the bus 200 be vacated for the boarding of user 10A.

(Management Server)

The management server 300 is a server that manages the operation of the bus 200. The management server 300 receives the application information from the user terminal 100 via network N1. The management server 300 determines the scheduled traveled route, etc., of the bus 200 based on the application information. The management server 300 also displays specific information on the display 210 at the bus 200. Details of how the management server 300 displays specific information on the display 210 are described below.

The management server 300 comprises a computer having a processor 310, main memory 320, auxiliary storage 330, and a communication interface (communication I/F) 340. The processor 310 is, for example, a CPU (Central Processing Unit) or DSP (Digital Signal Processor). The main storage 320 is, for example, RAM (Random Access Memory). Auxiliary storage 330 is, for example, ROM (Read Only Memory). The auxiliary storage 330 is, for example, a hard disk drive (HDD) or a disk storage medium such as a CD-ROM, DVD disk, or Blu-ray disk. The auxiliary storage 330 may also be removable media (portable storage media). Here, USB memory sticks or SD cards are examples of removable media. The communication I/F 340 is, for example, a LAN (Local Area Network) interface board or a wireless communication circuit for wireless communication.

In the management server 300, the auxiliary storage 330 contains an operating system (OS), various programs, and various information tables. In the management server 300, the processor 310 can load the program stored in the auxiliary storage 330 into the main storage 320 and execute it to realize various functions as described below. However, some or all of the functions in the management server 300 may be realized by hardware circuits such as ASICs or FPGAs. The management server 300 does not necessarily have to be realized by a single physical configuration, but may be composed of multiple computers that are linked to each other.

(Functional Configuration)

Figure 4:
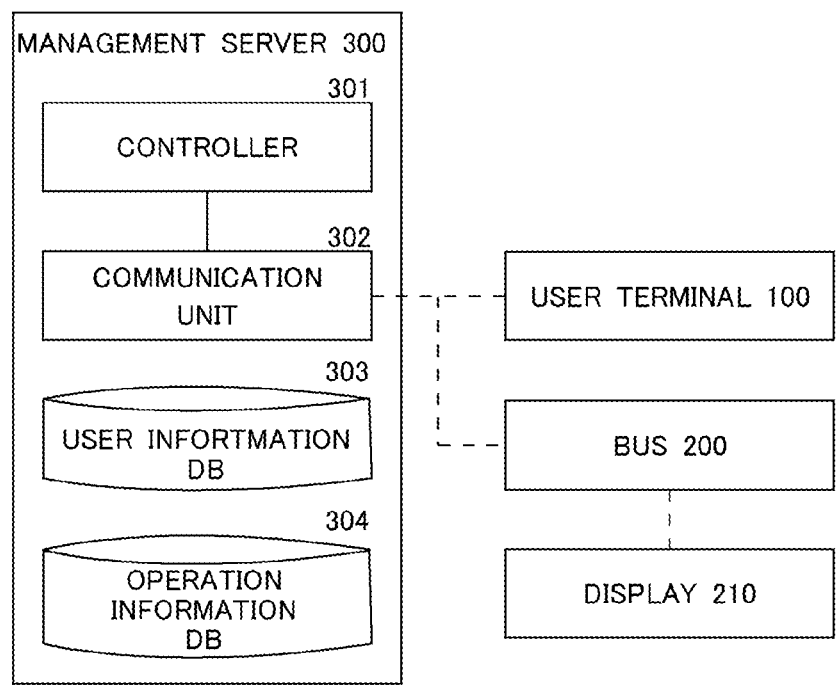
FIG. 4 is a block diagram indicating an example of the functional configuration of a management server.

Next, the functional configuration of the management server 300, which constitutes the operation system 1, is described based on FIG. 4 through FIG. 6. FIG. 4 is a block diagram indicating an example of the functional configuration of the management server 300.

The management server 300 comprises a controller 301, a communication unit 302, a user information database 303 (user information DB 303), and an operation information database 304 (operation information DB 304). The controller 301 has the function of performing arithmetic operations to control the management server 300. The controller 301 can be realized by processor 310 in management server 300. The communication unit 302 has the function of connecting the management server 300 to the network N1. The communication unit 302 can be realized by the communication I/F 340 in the management server 300.

The user information DB 303 has the function of holding user information. The user information DB 303 can be realized by the auxiliary storage 330 in the management server 300. User information is information about the users of the bus 200. The controller 301 receives the application information from the user terminal 100 by the communication unit 302. The controller 301 generates user information held in the user information DB 303 based on the received application information.

FIG. 5 indicates an example of the table structure of user information held in the user information DB 303. As indicated in FIG. 5, the user information has a user ID field, a terminal information field, a boarding point field, a drop-off point field, and a remarks field. An identifier (user ID) is entered in the user ID field to identify the 10 users of the bus 200. In the terminal information field, information about the user terminal 100 of the user 10 corresponding to the user ID entered in the User ID field is entered. The terminal information field is populated with an identifier to identify the user terminal 100 and information about the destination of information to the user terminal 100.

In the Boarding Point field, information about the point where the user 10 corresponding to the user ID entered in the User ID field is scheduled to board the bus 200 is entered. In the Boarding Point field, for example, information is entered to identify the bus stop where the user 10 plans to board the bus 200. In the drop-off point field, information about the point where the user 10 corresponding to the user ID entered in the user ID field gets off the bus 200 is entered. In the drop-off point field, for example, information is entered to identify the bus stop where the user 10 plans to get off the bus 200. The information used to identify the bus stop is, for example, the name of the bus stop or the coordinates (e.g., latitude and longitude) of the bus stop.

In the Remarks field, remarks about the user 10 corresponding to the user ID entered in the User ID field are entered. If user 10 is a wheelchair user, the information "wheelchair use" is entered in the remarks field. The controller 301 enters the information "wheelchair use" in the remarks field based on the information indicating that user 10A is a wheelchair user, which is included in the application information received from the user terminal 100 of user 10A.

By obtaining the user information held in the user information DB 303, the controller 301 can determine the point (bus stop) where user 10 (user 10A and user 10B) gets on and off the bus 200. The controller 301 can also determine whether the user 10 (user 10A and user 10B) is a wheelchair user or not by obtaining the user information held in the user information DB 303.

The controller 301 determines the bus 200 operation plan based on the boarding and drop-off points of each user 10 in the user information maintained in the user information DB 303. The controller 301 generates operation information based on the determined operation plan. The controller 301 stores the generated operation information in the operation information DB 304. The operation information DB 304 has the function of holding operation information. The operation information DB 304 can be realized by auxiliary storage 330 in the management server 300. The operation information is information about the operation of the bus 200. FIG. 6 indicates an example of the table structure of operation information held in the operation information DB 304.

As FIG. 6 indicates, the operation information has a bus ID field, a departure point field, a departure time field, an arrival point field, an arrival time field, and an operation number field. The Bus ID field is populated with an identifier (bus ID) to identify the bus 200.

In the departure point field, information is entered to identify the point (bus stop) where the bus 200 stops for the user 10 to get on and off the bus and then departs for service. The departure time field is populated with the time at which the bus 200 departs from the point where the bus departs (departure point) as entered in the Departure Point field. The arrival point field is populated with information to identify the next stop (bus stop) for the bus 200 that departed from the departure point entered in the departure point field. In the Arrival Time field, the time when the bus 200 arrives at the point where the bus 200 stops (arrival point) entered in the Arrival Point field is entered.

In the operation number field, the order in which the bus 200 moves between bus stops is entered. In the operation number field, the smallest natural number is entered from the top to the bottom: "1", "2", "3", . . . . If the operation number "1" is entered in the operation number field, the departure point entered in the departure point field corresponding to the operation number is the first bus stop of the bus 200. If the operation number "1" is entered in the operation number field, the arrival point entered in the arrival point field corresponding to the operation number is the next bus stop after the first bus stop of the bus 200 (hereinafter sometimes referred to as the "second bus stop").

If the operation number "2" is entered in the operation number field, the departure point corresponding to the operation number will match the arrival point corresponding to the operation number "1". That is, if the operation number "2" is entered in the operation number field, the departure point corresponding to this operation number is the second bus stop. If "2" is entered as the operation number in the operation number field, the arrival point corresponding to the operation number is the next bus stop after the second bus stop (hereinafter referred to as "third bus stop"). If the operation number "3" is entered in the operation number field, the departure point corresponding to this operation number is the third bus stop. If the operation number "3" is entered in the operation number field, the departure point corresponding to this operation number is the next bus stop after the third bus stop. Thus, the bus 200 operates between bus stops in the order of the operation numbers in the operation information.

By retrieving the operation information held in the operation information DB 304, the controller 301 can refer to the departure point, departure time, arrival point, and arrival time of the bus 200. This allows the controller 301 to monitor the operational status of the bus 200. The controller 301 can update the operation information as appropriate if there are delays or route changes in the operation of the bus 200.

The controller 301 can determine whether or not user 10A is among the users of the bus 200 based on the user information held in the user information DB 303. If the controller 301 determines that user 10A is among the users of the bus 200, it sends the instruction information to the bus 200. Here, the instruction information is information that instructs the bus 200 to display specific information on the display 210. In this way, the controller 301 outputs the specific information via the display 210 in the bus 200.

At this time, the controller 301 displays the specific information on the display 210 in the bus 200 during the period from a predetermined time before the bus 200 arrives at the specific bus stop to the specific bus stop. Specifically, the controller 301 identifies the specific bus stop where the bus 200 stops for the user 10A to board the bus 200 based on the user information held in the user information DB 303. The controller 301 obtains the time when the bus 200 arrives at the specific bus stop from the operation information held in the operation information DB 304.

The controller 301 determines the display period to be the period from a predetermined time before the time when the bus 200 arrives at the specific bus stop to the time when the bus 200 arrives at the specific bus stop. The predetermined time period is set so that the specific information is displayed on the display 210 to allow a sufficient period of time for the user 10B on the bus 200 to request that the user 10A vacate the area around the entrance to board the bus 200. The controller 301 transmits the instruction information including the display period to the bus 200 by means of the communication unit 302. When the bus 200 receives the instruction information from the management server 300, it displays the specific display on the display 210 in the bus 200 during the display period.

(Instruction Processing)

Figure 7:
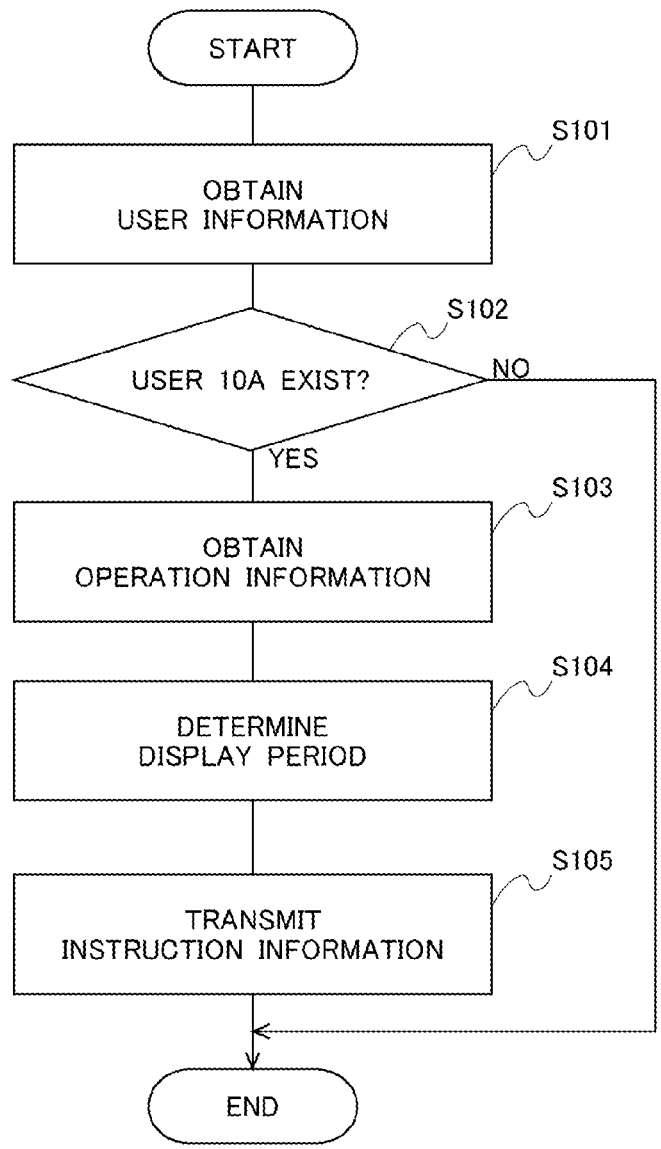
FIG. 7 is a flowchart of the instruction process.

Next, the instruction process executed by the controller 301 in the management server 300 in the operation system 1 of this embodiment is described based on FIG. 7. FIG. 7 is a flowchart of the instruction process. The instruction process is used to send instruction information to the bus 200. The instruction process is repeated at predetermined intervals.

In the instruction process, user information is first obtained from the user information DB 303 in S101. Next, in S102, based on the user information obtained in S101, it is determined whether or not user 10A exists among the users of bus 200. Specifically, the controller 301 determines whether or not user 10A exists among the users of the bus 200 by determining whether or not "wheelchair use" is entered in the remarks field in the user information. If a negative decision is made in S102, user 10A does not exist in users 10 of bus 200. Therefore, the instruction process is temporarily terminated.

If an affirmative decision is made in S102, operation information is obtained from the operation information DB 304 in S103. Next, in S104, the display period is determined based on the user information obtained in S101 and the operation information obtained in S103. Next, in S105, the instruction information containing the display period is transmitted to the bus 200. This allows specific information to be displayed on the display 210 at the bus 200 during the display period. The instruction process is then terminated.

In this embodiment, specific information is displayed on the display 210 in the bus 200 during the display period in the operation system 1. This allows user 10B on the bus 200 to know that user 10A will board the bus 200 at the specific bus stop before arriving at the specific bus stop. In this way, the presence of user 10B around the boarding/exiting entrance of the bus 200 is inhibited when user 10A boards the bus 200 by allowing user 10B to vacate the area around the boarding/exiting entrance or take other action. It also suppresses the need for user 10A to directly request other users 10B to vacate the area around the bus 200 entrance in order to board the bus 200. Therefore, user 10A can smoothly board the bus 200. As a result, the user 10A is restrained from feeling annoyed when boarding the bus 200.

In this embodiment, user 10A is waiting for the arrival of the bus 200 at a specific bus stop. On the other hand, the display period is set so that when the bus 200 arrives at the specific bus stop, the display of the specific information on the display 210 is terminated. Therefore, user 10A does not see that display 210 is displaying specific information requesting that the area around the entrance be vacated for user 10A. In other words, user 10A does not know that specific information has been displayed to user 10B. Thus, user 10A can board the bus 200 without knowing that user 10B has cooperated in clearing the area around the bus 200 entrance for user 10A. As a result, user 10A can board the bus 200 without worrying about other users 10B.

As explained above, in the operation system 1 in this embodiment, the user 10A is restrained from feeling annoyed when boarding the bus 200. In addition, in the operation system 1 in this embodiment, user 10A can board the bus 200 without worrying about other users 10B. This can therefore promote the use of the bus by user 10A.

Variant 1 of the First Embodiment

In this embodiment, the management server 300 sends instruction information to the bus 200 to display specific information on the display 210. However, the management server 300 does not necessarily have to send the instruction information to the bus 200. For example, the in-vehicle device of the bus 200 may obtain user and operation information from the management server 300 and send instruction information directly to the display 210 based on the user and operation information.

Variation 2 of the First Embodiment

Figure 8:
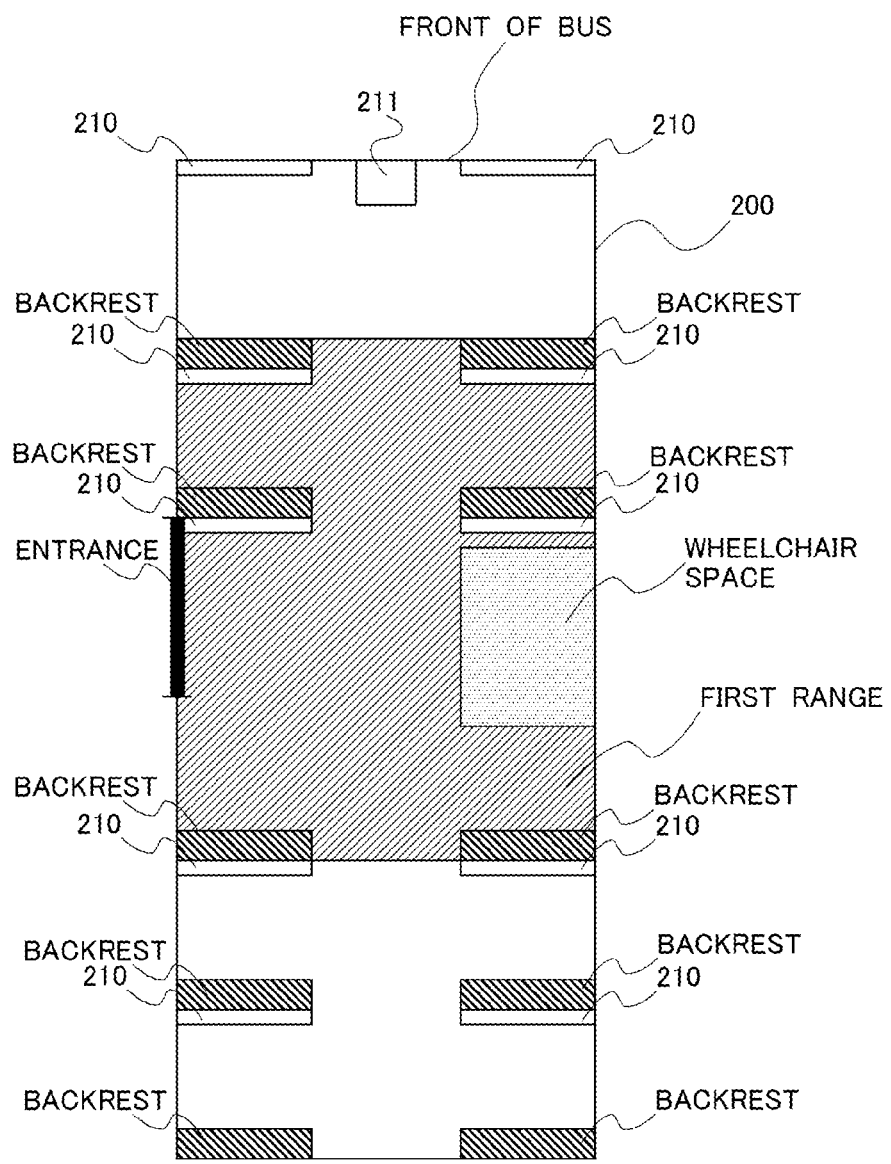
FIG. 8 indicates an example of the inside of a bus in Variant 2 of the first embodiment.

In this variant, the bus 200 includes a plurality of displays 210. FIG. 8 indicates an example of the inside of the bus 200 in this variant. FIG. 8 illustrates a view of the inside of the bus 200 from above. As indicated in FIG. 8, the bus 200 has multiple seats. The display 210 is installed on the backrest of a seat in the bus 200 where other seats are located in the rear. A display 210 is also installed on the front wall of the bus 200. This arrangement of multiple display 210s on the bus 200 makes it possible to display specific information to users 10B at each location on the bus 200. In other words, at the bus 200, there is a display 210 corresponding to each user 10B at the bus 200, which can display specific information to each user 10B.

Therefore, in this variant, the management server 300 displays the specific information on the display 210 in the first range indicated in FIG. 8 among the multiple display 210 in the bus 200. The management server 300 sends instruction information to the bus 200 that includes information specifying the display 210 that exists within the first range as the display 210 that displays the specific information among the plurality of display 210. Upon receiving the instruction information, the bus 200 displays the specific information on display 210, which is located within the first range. In this way, specific information can be displayed on the display 210, which displays information to the user 10B who is within the first range.

Here, the first range is set as the range where the presence of user 10B is expected to be an obstacle for user 10A to get on. Therefore, by displaying specific information on the display 210 that exists within the first range, it is possible to suppress the display of unnecessary specific information to user 10B, who is not an obstacle for user 10A to get on.

In this variant, the specific information is displayed to the user 10B in the first range by displaying the specific information on all displays 210 that exist in the first range. However, it is not necessarily necessary to have all displays 210 in the first range display specific information.

As indicated in FIG. 8, the bus 200 includes camera 211. The camera 211 is a camera that takes images of the inside of the bus 200. The camera 211 transmits the captured video images to the management server 300 via the bus 200. Here, the video image that the camera 211 sends to the management server 300 may include the user 10B in the bus 200.

The management server 300 detects the user 10B who is within the first range based on the video image inside the bus 200 received from the bus 200. Based on the detected position of the user 10B, the management server 300 identifies the display 210 that displays information to the user 10B at that position among the multiple displays 210. The management server 300, for example, identifies the display 210 that displays information to the user 10B as the display 210 that is to display the specific information. For example, if user 10B is seated in a seat, the display 210 installed on the backrest of the seat in front of user 10B's seat is identified as the display 210 (the display 210 corresponding to user 10B) that is to display specific information to user 10B.

The management server 300 sends instruction information to the bus 200, which contains information that designates the identified display 210 among the multiple displays as the display 210 on which the specific information is to be displayed. Upon receipt of the instruction information, the bus 200 displays the specific information on the display 210 designated by management server 300. In this way, it is possible to suppress unnecessary guidance to user 10B who is not an obstacle to getting on and off the train when user 10A gets on.

Variant 3 of the First Embodiment

It is assumed that it will take longer for user 10A to get on and off the bus 200 than for user 10B to get on and off the bus 200. If this is the case, the period of time that the bus 200 stops at a particular bus stop may be longer than assumed by user 10B. This is expected to cause irritation to user 10B on board the bus 200. Therefore, in this variant, the management server 300 displays specific information on the display 210, including the period of time that the bus 200 will stop at the specific bus stop.

The management server 300 obtains the number of users 10A boarding at the specific bus stop based on the user information held in the user information DB 303. The management server 300 calculates the time that one or more users 10A are expected to take to board the bus 200 at the specific bus stop by the product of the number of users 10A boarding at the specific bus stop and the time that one user 10A is expected to take to board the bus 200. The management server 300 calculates the period during which the bus 200 stops at the specific bus stop (hereinafter referred to as the "specified period") based on the time that one or more users 10A are expected to take to board the bus 200 at the specific bus stop.

The management server 300 sends instruction information including instructions for the display of a specific period of time to the bus 200. Then the bus 200 causes the display 210 to show the display information including the specific period of time. This allows the user 10B boarding the bus 200 to know how long it will take for the bus 200 to depart. Therefore, the irritation felt by user 10B due to the bus 200 not departing can be suppressed. As a result, it is possible to inhibit user 10A from boarding the bus 200 in a situation where user 10B is irritated, thereby promoting the use of the bus 200 by user 10A.

Variant 4 of the First Embodiment

In this variant, the management server 300 sends content information to the bus 200. Here, the content information is information that includes content provided to user 10B while the bus 200 is stopped at the specific bus stop. Specifically, content information is information that includes video or music content.

Specifically, the management server 300 identifies the period during which the bus 200 is stopped at the specific bus stop (hereinafter referred to as "stop period") based on the user information held in the user information DB 303 and the operation information held in the operation information DB 304. The stop period is identified based on the arrival time of the specific bus stop and the departure time of the specific bus stop in the operation information. The management server 300 then transmits the content information, including the stop period, to the bus 200. Upon receiving the content information, the bus 200 causes the content information to be provided to user 10B during the stop period by the display 210.

With content information being provided to user 10B during the stop period by the display 210, it is assumed that user 10B will pay attention to the content information provided. This would prevent user 10B from focusing on user 10A when user 10A boards the bus 200. This will help to discourage users 10A from using the bus 200 because they do not want to attract the attention of users 10B when they board the bus. As a result, the use of the bus 200 by user 10A can be promoted.

2nd Embodiment

In the first embodiment, specific information is displayed on the display 210 at the bus 200. On the other hand, in this embodiment, specific information is displayed on signage 220 at specific bus stops. In other words, in this embodiment, the management server 300 outputs specific information via the signage 220. Only the points that differ from the first embodiment are explained below.

(System Overview)

Figure 9:
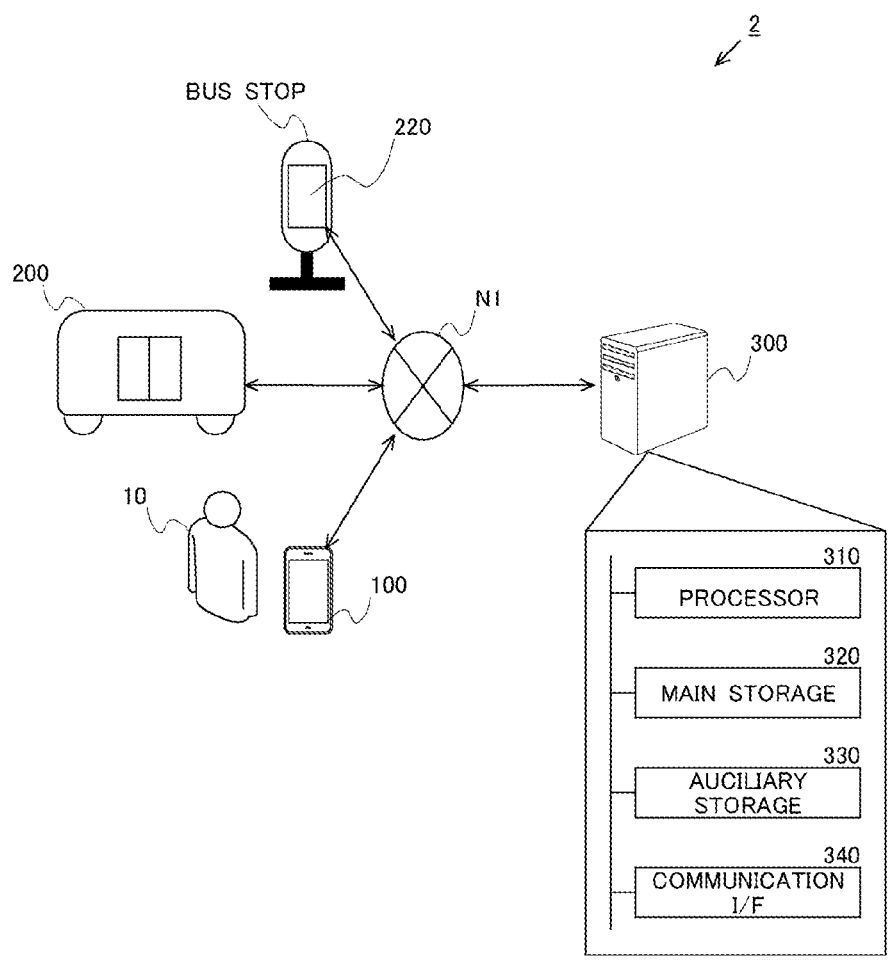
FIG. 9 indicates a schematic diagram of the second embodiment of the operation system 2.
Figure 10:
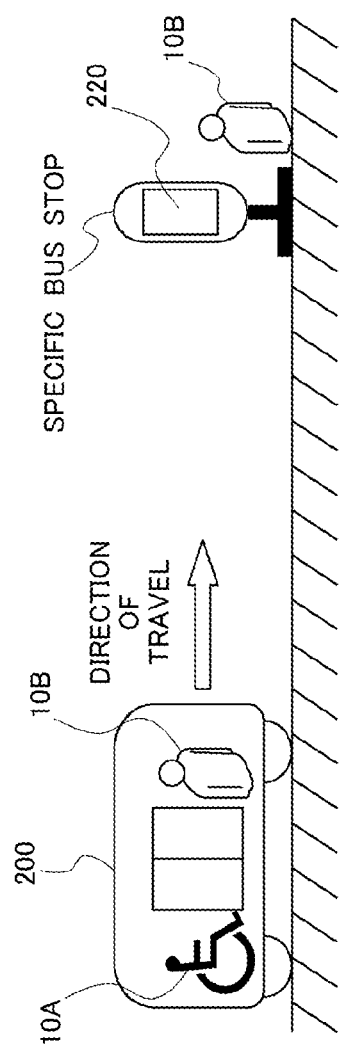
FIG. 10 indicates the bus operation in the second embodiment.

The operation system 2 in this embodiment is described based on FIG. 9 and FIG. 10 FIG. 9 indicates a schematic diagram of the operation system 2. The operation system 2 in this embodiment consists of user terminal 100, the bus 200, the signage 220, and management server 300. In the operation system 2, the user terminal 100, the bus 200, the signage 220, and the management server 300 are interconnected by network N1.

(Signage)

Signage 220 is signage installed at bus stops. Signage 220 displays information to users 10 who are waiting for the bus 200 to arrive at the bus stop. FIG. 10 indicates the operation of the bus 200 in this embodiment. As indicated in FIG. 10, user 10A and user 10B are on board the bus 200. Bus 200 is traveling toward the bus stop where user 10A gets off the bus 200 (hereinafter referred to as the "specific bus stop"). At the specific bus stop, user 10B is waiting for the bus 200 to arrive for boarding.

As indicated in FIG. 10, Signage 220 is installed at a specific bus stop. In other words, in this embodiment, specific information is displayed on the signage 220 instead of the display 210 in the first embodiment. In other words, in this embodiment, specific information is displayed to user 10B by signage 220 at the specific bus stop where user 10A gets off.

The controller 301 in the management server 300 displays specific information on the signage 220 from a predetermined time before the time the bus 200 arrives at the specific bus stop and during the time the bus 200 arrives at the specific bus stop. Specifically, the controller 301 identifies the specific bus stop where the user 10A is scheduled to get off the bus 200 based on the user information held in the user information DB 303. The controller 301 obtains the time when the bus 200 arrives at the specific bus stop from the operation information held in the operation information DB 304. The controller 301 determines the display period to be the period from a predetermined time before the time when the bus 200 arrives at the specific bus stop to the time when the bus 200 arrives at the specific bus stop. The controller 301 then sends the instruction information including the display period to the signage 220.

The signage 220 displays specific information during the display period based on the instruction information received from management server 300. This allows user 10B at the specific bus stop to know that user 10A will be getting off the bus 200 at the specific bus stop before arriving at the specific bus stop. Then, user 10B at the specific bus stop can take measures such as clearing the area around the entrance to allow user 10A to smoothly get off the bus 200. As a result, the user 10A is restrained from feeling annoyed when getting off the bus 200.

In this embodiment, user 10A is boarding the bus 200. On the other hand, the display period is set so that when the bus 200 arrives at the specific bus stop, the display of the specific information on the signage 220 is terminated. Therefore, user 10A gets off the bus 200 without seeing that the signage 220 has a specific display requesting that the area around the entrance be vacated for user 10A. Then user 10A can get off the bus 200 without knowing that specific information has been given to user 10B. As a result, the user 10A can get off the bus 200 without worrying about other users 10B.

As explained above, specific information is displayed on the signage 220 in the operation system 2 in this embodiment. This suppresses the hassle that the user 10A may experience when getting off the bus 200. In addition, the user 10A can get off the bus 200 without worrying about other users 10B. As a result, the use of the bus by the user 10A can be promoted.

Variant 1 of the Second Embodiment

Similar to Variation 3 of the first embodiment, this embodiment may display specific information on the signage 220, including the display of a specific period of time. In other words, even when user 10A gets off the bus 200, the signage 220 may display specific information including the period of time that the bus 200 will stop at the specific bus stop.

Specifically, the management server 300 obtains the number of users 10A who get off at the specific bus stop based on the user information held in the user information DB 303. The management server 300 calculates the time for the bus 200 to stop at a particular bus stop based on the time it takes one or more users 10A to get off the 200. The management server 300 then sends instruction information to the signage 220, including the time that the bus 200 will stop at the specific bus stop. In this way, the use of the bus 200 by user 10A can still be promoted, as it can inhibit user 10A from getting off the bus 200 in a situation where user 10B is irritated.

Variant 2 of the 2nd Embodiment

Similar to Variant 4 of the first embodiment, in this embodiment, the management server 300 may transmit content information to the bus 200. In other words, the management server 300 may transmit content information to the bus 200 even when user 10A gets off the bus 200.

By transmitting content information to the bus 200 when user 10A gets off the bus 200, it is possible to suppress the attention of user 10B to user 10A even when user 10A gets off the bus 200. As a result, the use of the bus 200 by user 10A can be promoted.

3rd Embodiment

In the first embodiment, the management server 300 displays specific information on the display 210 at the bus 200. In the second embodiment, the management server 300 displays specific information on the signage 220. However, the management server 300 does not necessarily have to display specific information on the display 210 or signage 220. In this embodiment, the management server 300 causes the user terminal 100 of the user 10B boarding the bus 200 to display specific information.

The controller 301 in the management server 300 obtains the boarding and drop-off points of the user 10B based on the user information held in the user information DB 303. The controller 301 identifies the section where user 10B is boarding the bus 200 based on the boarding and drop-off points of user 10B. The controller 301 identifies the time when the user 10B boards the bus 200 and the time when the user 10B gets off the bus 200 based on the section where the user 10B is boarding the bus 200 and the operation information maintained in the operation information DB 304.

Based on the time when user 10B boards the bus 200 and the time when he/she disembarks from the bus 200, the controller 301 determines whether or not user 10B is on the bus 200 at a predetermined time before the time when the bus 200 arrives at the specific bus stop (hereinafter sometimes referred to as "display time"). In this way, the controller 301 identifies the user 10B who is boarding the bus 200 at the display time. The management server 300 then sends the display information to the user terminal 100 of the user 10B who is boarding the bus 200 at the display time (hereinafter referred to as "target user 10B"). Here, the display information is information for the user terminal 100 of the target user 10B to display specific information requesting the user 10A to vacate the area around the entrance for the user 10B. In this way, the management server 300 causes the display of specific information to the target user 10B at the display time.

(Transmission Process)

Figure 11:
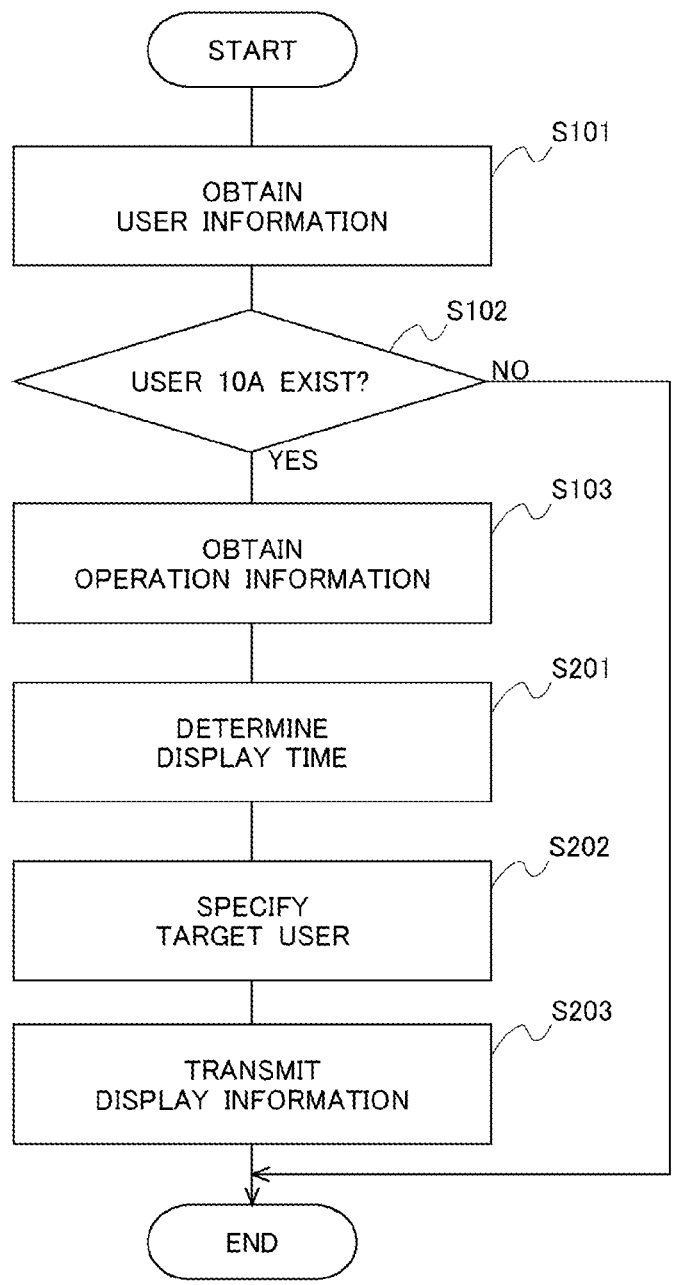
FIG. 11 is a flowchart of the transmission process.

Next, the transmission process in this embodiment is explained based on FIG. 11. FIG. 11 is a flowchart of the transmission process. The transmission process is for sending the display information to the user terminal 100 of the target user 10B. The transmission process is repeated at predetermined intervals. The processes from S101 to S103 in the transmission process are the same as the instruction process in the first embodiment, so the explanation is omitted.

In S201 in the transmission process, the display time is determined based on the operation information obtained in S103. Next, in S202, the target user 10B is specified based on the user information held in the user information DB 303. Next, in S203, the display information is transmitted to the target user 10B user terminal 100. Here, the controller 301 sends the display information to the user terminal 100 of the target user 10B based on the information about the destination of the information to the user terminal 100 entered in the terminal information DB field in the user information held in the user information DB 303. Then the user terminal 100 who receives the display information will display the specific information. The display process is then terminated.

As explained above, in the operation system 1 in this embodiment, the display information appears at the display time in the user terminal 100 of the target user 10B. This allows the target user 10B to know that user 10A will board the bus 200 at the specific bus stop. As a result, the user 10A is restrained from feeling annoyed when boarding the bus 200. In addition, user 10A can board the bus 200 without worrying about other users 10B. This can therefore promote the use of the bus by user 10A.

Variant 1 of the 3rd Embodiment

In this embodiment, management server 300 sends the display information to the user terminal 100 of the user 10B on the bus 200. On the other hand, in this variant, management server 300 sends the display information to the user terminal 100 of user 10B who is waiting for the bus 200 to arrive at the specific bus stop where user 10A is scheduled to get off.

The management server 300 obtains the boarding point of user 10B based on the user information held in the user information DB 303. The management server 300 identifies the user 10B as the target user 10B if the boarding point of the user 10B is a specific bus stop. Then management server 300 sends the display information to the user terminal 100 of the target user 10B. In this way, the use of the bus by user 10A can still be promoted.

4th Embodiment

In this embodiment, management server 300, the bus 200 displays a specific information on a floor display device 230 embedded in the floor of the bus 200. Only the points that differ from the first embodiment are explained below.

Figure 12:
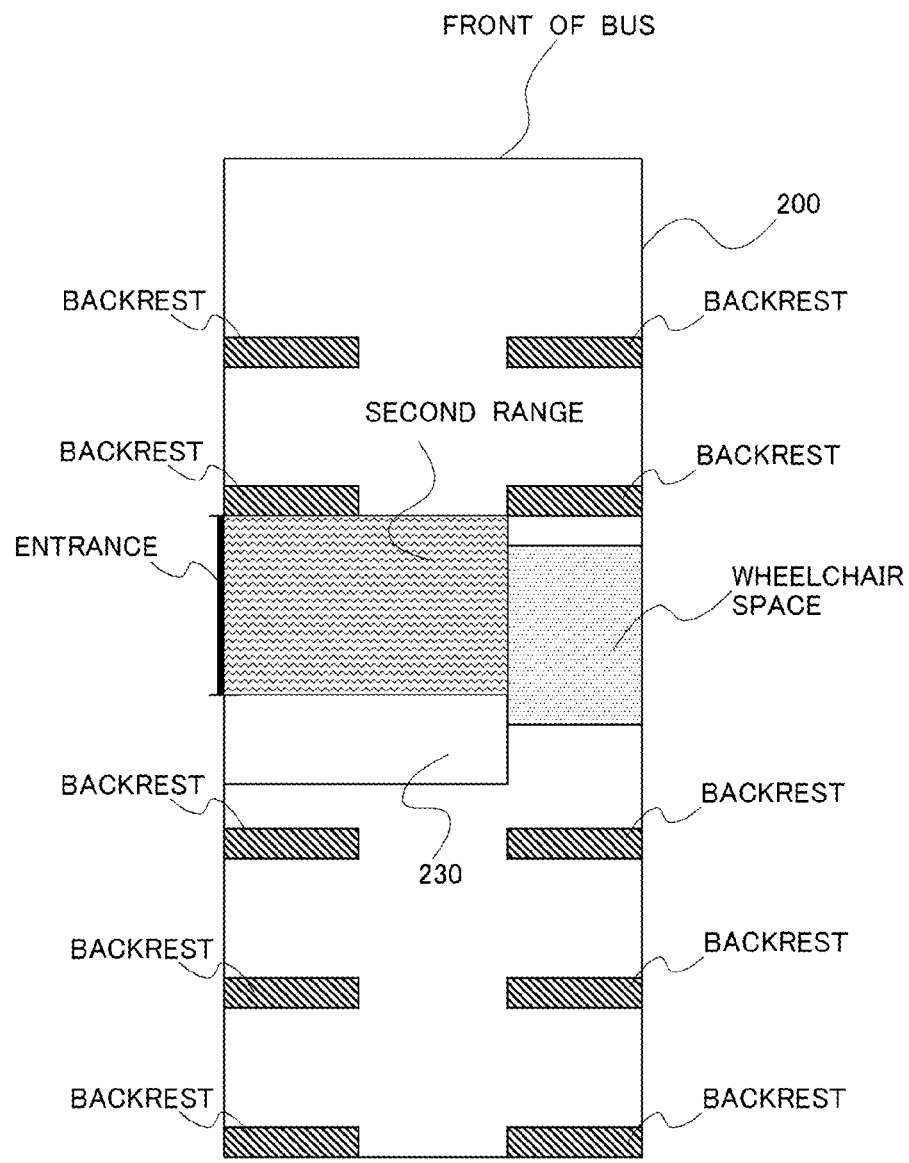
FIG. 12 indicates an example of the inside of a bus in the fourth embodiment.

FIG. 12 indicates an example of the inside of a bus in the fourth embodiment. FIG. 12 indicates the inside of the bus 200 viewed from above. As FIG. 12 indicates, bus 200 includes a floor display unit 230 embedded in the floor. Also, as indicated in FIG. 12, a second range is set up in front of the bus 200 boarding gate. The second range is set as the range where user 10B may be obstructed if he or she is present within the second range when user 10A rides.

When management server 300 sends instruction information including the display period to the bus 200, the bus 200 receives the instruction information and displays the specific information on floor display unit 230. In this embodiment, the specific information is information to prevent the user 10B from entering the second range. Specifically, the floor display unit 230 illuminates a second area on the floor surface as a display of specific information. By displaying specific information, the user 10B can be reminded that he/she should not enter the second range. In this way, the floor display unit 230 displays specific information, which inhibits user 10B from being within the second range when boarding the bus 200, allowing user 10A to smoothly board the bus 200. As a result, the use of the bus 200 by user 10A can be promoted.

In this embodiment, the display period may be determined as the time period from a predetermined time before the bus 200 arrives at the specific bus stop where user 10A is waiting for the bus 200 to the time when the bus 200 leaves the specific bus stop. In this way, it is possible to prevent user 10B from entering the second range while user 10A is still on the bus 200.

In this embodiment, management server 300 displays the specific information on the floor display unit 230 when user 10A is traveling toward a specific bus stop waiting for the bus 200 to arrive for boarding. However, the management server 300 does not necessarily have to display specific information on the floor display unit 230 when user 10A is traveling toward a specific bus stop waiting for the bus 200 to arrive in order to board the bus 200. The management server 300 may also display specific information on the floor display unit 230 when the user 10A is traveling toward a specific bus stop where he/she is getting off. In this way, the use of the bus 200 by user 10A can still be promoted.

5th Embodiment

In this embodiment, the bus 200 includes a plurality of spaces for parking a wheelchair used by the user 10A (hereinafter referred to as "wheelchair spaces"). In this case, if multiple 10A users board the bus 200, it is necessary to determine the wheelchair space to be used for each user 10A. Therefore, when multiple users 10A board the bus 200, the management server 300 determines a wheelchair space for each of the multiple users 10A to park their wheelchairs from among the multiple wheelchair spaces.

Figure 13:
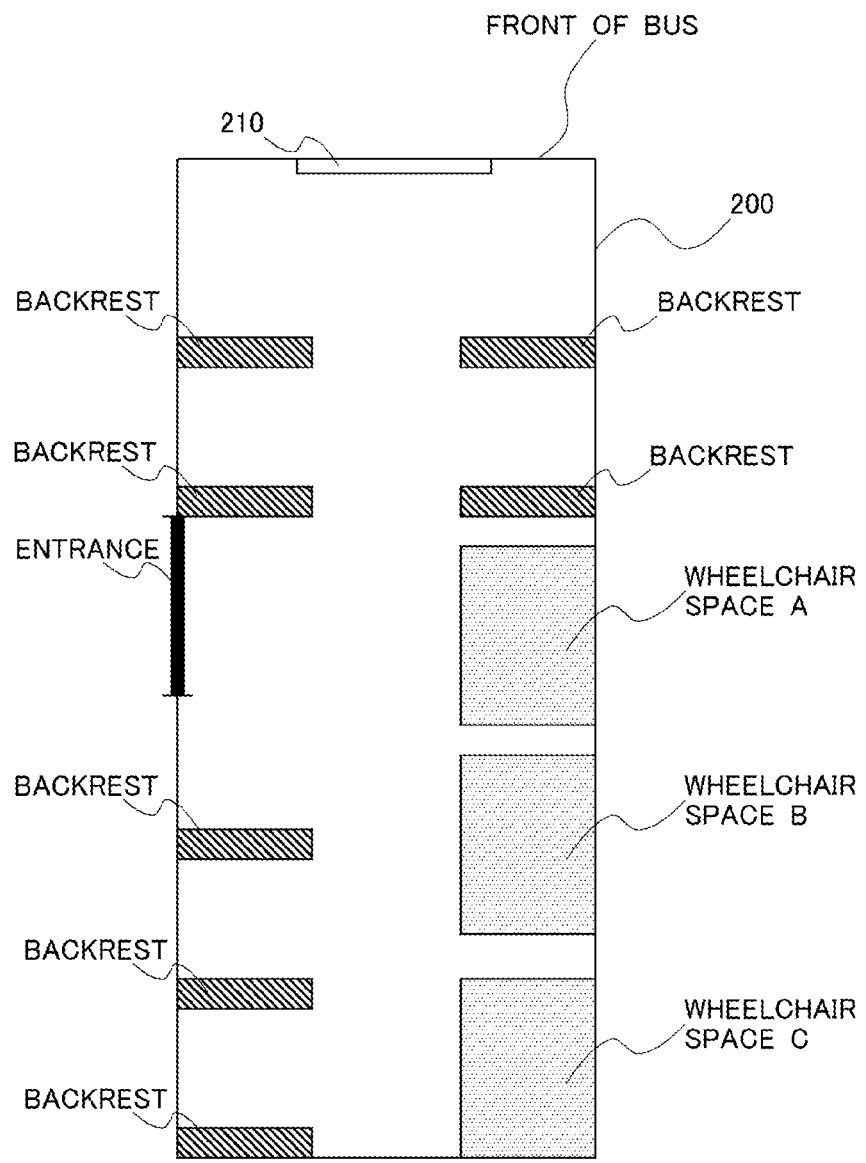
FIG. 13 indicates an example of the inside of a bus in the fifth embodiment.

FIG. 13 indicate an example of the inside of the bus 200. As FIG. 13 indicates, bus 200 has multiple wheelchair spaces. FIG. 13 In the indicate example, in order of proximity to the boarding gate, there are wheelchair space A, wheelchair space B, and wheelchair space C.

The controller 301 determines whether or not multiple users 10A will board the bus 200 based on the user information maintained in the user information DB 303. Specifically, based on the user information held in the user information DB 303, the system determines whether or not multiple users 10A have a common usage section.

When the controller 301 determines that a plurality of users 10A will board the bus 200, the number of users 10 (users 10B) on the bus 200 when each user 10A boards the bus 200 and the number of users 10B on the bus 200 when each user 10A gets off the bus 200. Specifically, the controller 301 obtains the number of users 10B boarding the bus 200 at the time each user 10A boarded and alighted, based on the user information maintained in the user information DB 303. The controller 301 then calculates the sum of the number of users 10B on the bus 200 when each user 10A boards the bus 200 and the number of users 10B on the bus 200 when each user 10A gets off the bus 200 as the specified number of users.

The greater the specified numbers, the greater the number of users 10B present in the bus 200 when user 10A gets on the bus 200 and the greater the number of users 10B present in the bus 200 when user 10A gets off the bus 200. Then, it is assumed that the greater the specified numbers, the greater the number of users 10B who will be affected when user 10A gets on and off the bus 200. Therefore, when multiple users 10A board the bus 200, the controller 301 determines a wheelchair space for each of the multiple users 10A to park their wheelchairs from among the multiple wheelchair spaces based on the specified number of people for each user 10A.

Specifically, the controller 301 determines that the more specific number about user 10A, the more wheelchair spaces in the bus 200 that are closer to the boarding and exiting entrances are determined to be wheelchair spaces where the users 10A can park their wheelchairs. In the example indicated by FIG. 13, assume that three users 10A board the bus 200. In this case, controller 301 determines the wheelchair space for user 10A with the largest specified number to be wheelchair space A. The controller 301 also determines the wheelchair space for the user 10A with the least specified number to be wheelchair space C.

Then, the user 10A with the largest specified number will use the wheelchair space A closest to the boarding gate. Therefore, the number of users 10B who are affected by the boarding and disembarking of user 10A because they are using wheelchair space A can be less than if said user 10A were using wheelchair space B or C. The user 10A with the least specified number uses the wheelchair space C farthest from the boarding gate. Therefore, the use of wheelchair space C by user 10A, who has the smallest specified number, has less impact on user 10B than if user 10A, who has a larger specified number, uses wheelchair space C. A known method can be used by the controller 301 to determine wheelchair spaces for each of the multiple users 10A based on the number of 10B users on the bus 200 (crowdedness) and the section of the bus used by each user 10A.

(Decision Process)

Figure 14:
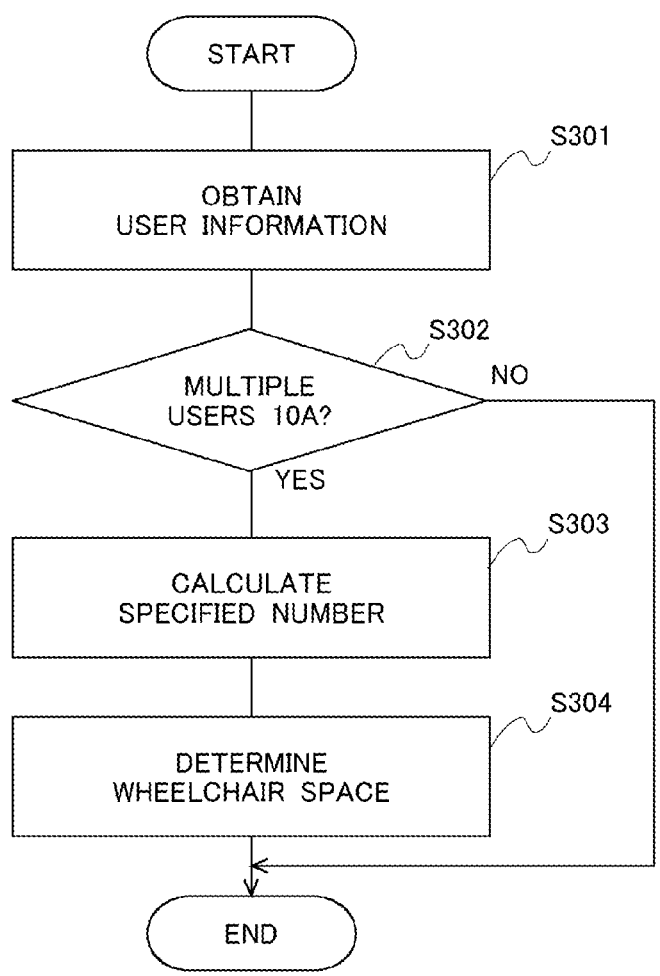
FIG. 14 is a flowchart of the decision-making process.

Next, the decision process in this embodiment is explained based on FIG. 14 FIG. 14 is a flowchart of the decision process. The determination process determines the wheelchair space for each of the multiple users 10A. The decision process is repeated at predetermined intervals.

In the decision process, user information is first obtained in S301. Next, at S302, the system determines whether or not multiple users 10A are scheduled to board the bus 200. If a negative decision is made in S302, at least one user 10A boards the bus 200. Therefore, there is no need to determine wheelchair space when at least one user 10A is boarding the bus 200. In the example indicated by FIG. 13, at least one user 10A uses wheelchair space A. The decision process is then terminated.

If an affirmative decision is made in S302, the specified number for each user 10A is calculated based on the user information held in the user information DB 303. Next, in S304, each user 10A wheelchair space is determined based on the specified number of people. The decision process is then terminated.

Thus, by determining wheelchair spaces based on a specified number of people, it is possible to control the number of users 10B who are affected when user 10A gets on and off the bus 200. In this way, user 10A can smoothly get on and off the bus 200, thus promoting the use of the bus 200 by user 10A.

OTHER EMBODIMENT

The abovementioned embodiment is only an example, and the present disclosure may be modified and implemented as appropriate without departing from the gist thereof. The processes and means described in present disclosure may be freely combined as long as no technical contradictions arise.

The process described as being performed by one device may be shared and executed by multiple devices. Alternatively, the processes described as being performed by different devices may be performed by one device. In a computer system, it is possible to flexibly change what hardware configuration (server configuration) is used to realize each function.

The present disclosure can also be realized by supplying a computer program implementing the functions described in embodiment above to a computer and having one or more processor of said computers read and execute the program. Such computer programs may be provided to a computer by a non-transient computer readable storage medium that can be connected to the computer's system bus, or they may be provided to a computer via network. Non-transient computer readable storage media, for example, any type of disk, such as magnetic disks (such as floppy (registered trademark) disks or hard disk drives (HDDs)), optical disks (such as CD-ROM, DVD disks, or Blu-ray disks), Any type of media suitable for storing electronic instructions, such as read-only memory (ROM), random access memory (RAM), EPROM, EEPROM, magnetic cards, flash memory, or optical cards.

What is claimed is:

1. An information processing apparatus comprising a controller comprising at least one processor configured to:
   output, via a predetermined display device, specific information related to the boarding and alighting of a bus by a specified user using a wheelchair, from a predetermined time before the time when a bus stops for the specific user to board and alight the bus; and
   terminate outputting the specific information when the bus stops.

2. The information processing apparatus according to claim 1, wherein
   the predetermined display device is installed in the bus.

3. The information processing apparatus according to claim 2, wherein a plurality of the predetermined display devices are installed in the bus, and
   the controller outputs the specific information via the predetermined display device corresponding to a predetermined first range among the plurality of the predetermined display devices, which is the range where a general user other than the specific user becomes an obstacle to boarding the bus by the specific user when the general user is present.

4. The information processing apparatus according to claim 3, wherein the controller detects the general user present within the predetermined first range based on moving images captured by a camera capturing images in the bus, and outputs the specific information via the predetermined display device corresponding to the detected general users.

5. The information processing apparatus according to claim 1, wherein
   the predetermined display device is installed at a point where the bus stops for the specific user to get off the bus.

6. The information processing apparatus according to claim 1, wherein the predetermined display device is a terminal associated with a general user other than the specific user.

7. The information processing apparatus according to claim 1, wherein the predetermined display device is embedded in the floor of the bus, and wherein the specific information is information to prevent a general user other than the specific user from entering a predetermined second range in the bus.

8. The information processing apparatus according to claim 1, wherein the specific information includes information requesting that the area around the bus entrance be vacated to allow the specific user to board and alight the bus.

9. The information processing apparatus according to claim 1, wherein the bus includes a plurality of spaces for parking a wheelchair used by the specified user and wherein the controller determines, when a plurality of the specific user board the bus, based on the number of users of the bus and the points at which each of the plurality of specific users board the bus and get off the bus, a space for each of the plurality of specific users to park the wheelchair from among the plurality of spaces.

10. The information processing apparatus according to claim 1, wherein the specific information includes information regarding the period of time during which the bus is stopped for boarding and alighting by the specified user.

11. The information processing apparatus according to claim 1, wherein the bus has a device that provides content information including video or music content to the user of the bus, and wherein the controller outputs the content information via the device during boarding and alighting of the bus by the specific user.

12. An information processing method that is performed by a computer, the method includes:
    outputting, via a predetermined display device, specific information related to the boarding and alighting of a bus by a specified user using a wheelchair, from a predetermined time before the time when a bus stop for the specific user to board and alight the bus;
    terminating outputting the specific information when the bus stops.

13. The information processing method according to claim 12, wherein the predetermined display device is installed in the bus.

14. The information processing method according to claim 12 wherein
    the predetermined display device is installed at a point where the bus stops for the specific user to get off the bus.

15. A non-transitory storage medium storing a program for causing a computer to perform an information processing method, wherein the information processing method includes:
    outputting, via a predetermined display device, specific information related to the boarding and alighting of a bus by a specified user using a wheelchair, from a predetermined time before the time when a bus stops for the specific user to board and alight the bus;
    terminating outputting the specific information when the bus stops.

16. The non-transitory storage medium according to claim 15, wherein
    the predetermined display device is installed in the bus.

17. The non-transitory storage medium according to claim 15, wherein
    the predetermined display device is installed at a point where the bus stops for the specific user to get off the bus.

18. An information processing apparatus comprising a controller comprising at least one processor configured to:
    output, via a predetermined display device, specific information related to the boarding and alighting of a bus by a specified user using a wheelchair, from a predetermined time before the time when a bus stops for the specific user to board and alight the bus, wherein
    the bus has a device that provides content information including video or music content to the user of the bus, and wherein the controller outputs the content information via the device during boarding and alighting of the bus by the specific user.

* * * * *